United States Patent
Phaff et al.

(10) Patent No.: US 10,545,067 B2
(45) Date of Patent: Jan. 28, 2020

(54) METHOD AND SYSTEM FOR TESTING AIRTIGHTNESS OF A BUILDING ENVELOPE

(71) Applicant: Nederlandse Organisatie voor toegepast-natuurwetenschappelijk onderzoek TNO, 's-Gravenhage (NL)

(72) Inventors: Johan Cornelis Phaff, 's-Gravenhage (NL); Wouter Antonius Borsboom, 's-Gravenhage (NL); Bastiaan Knoll, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 154 days.

(21) Appl. No.: 15/546,894

(22) PCT Filed: Feb. 8, 2016

(86) PCT No.: PCT/NL2016/050088
§ 371 (c)(1),
(2) Date: Jul. 27, 2017

(87) PCT Pub. No.: WO2016/129997
PCT Pub. Date: Aug. 18, 2016

(65) Prior Publication Data
US 2018/0024025 A1    Jan. 25, 2018

(30) Foreign Application Priority Data

Feb. 9, 2015   (EP) ..................................... 15154346

(51) Int. Cl.
*G01M 3/26*   (2006.01)
*G01F 1/34*   (2006.01)
(Continued)

(52) U.S. Cl.
CPC ................. *G01M 3/26* (2013.01); *G01F 1/34* (2013.01); *G01M 3/2815* (2013.01); *G01M 3/3236* (2013.01); *G01M 3/3263* (2013.01)

(58) Field of Classification Search
CPC ......... G01F 1/34; G01M 3/3236; G01M 3/26; G01M 3/2815; G01M 3/3263
See application file for complete search history.

(56) References Cited

U.S. PATENT DOCUMENTS 2,898,836 A * 8/1959 Lockheed ................. F24F 7/06
                                             454/229
3,818,764 A * 6/1974 Wagner ..................... G01L 7/041
                                             200/81.8
(Continued)

FOREIGN PATENT DOCUMENTS

JP    2002-228537 A    8/2002

OTHER PUBLICATIONS

Sherman et al., The Low Pressure Leakage Function of a Building, Lawrence Berkeley Laboratory—University of California, Nov. 1979.*

(Continued)

*Primary Examiner* — David A Rogers
(74) *Attorney, Agent, or Firm* — Leydig, Voit & Mayer, Ltd.

(57) ABSTRACT

A method and system for testing airtightness of a building envelope (10). An air flow generator (21) is provided that is switchable between at least two different flow rates (Q0,Q1). The air flow generator (21) is repeatedly switched between a first flow rate (Q0) and a second flow rate (Q1) for modulating the building pressure (P1) as a function of time (t) between respective equilibrium pressure values at the first flow rate (Q0) and the second flow rate (Q1). The relative building pressure (ΔP) is measured by a differential pressure transducer (31) and recorded as a function of time (t). A (Continued)

pressure modulation amplitude (ΔPmodulation) is calculated for providing a measure of the airtightness.

14 Claims, 2 Drawing Sheets

(51) Int. Cl.
*G01M 3/32* (2006.01)
*G01M 3/28* (2006.01)

(56) References Cited

U.S. PATENT DOCUMENTS

| | | | | |
|---|---|---|---|---|
| 4,363,236 A * | 12/1982 | Meyers | ................... | G01M 3/26 73/40 |
| 4,449,393 A * | 5/1984 | Tucker | ................... | G01M 3/26 49/463 |
| 4,459,843 A * | 7/1984 | Durham | .............. | G01M 3/3236 73/37 |
| 4,493,207 A * | 1/1985 | Dempsey | .............. | G01M 3/226 73/40.7 |
| 4,510,791 A * | 4/1985 | Yuill | ................... | G01M 3/3236 73/40 |
| 4,517,826 A * | 5/1985 | Cole | ........................ | G01M 3/26 73/40 |
| 4,578,994 A * | 4/1986 | Bedard, Jr. | ............ | G01L 19/12 181/256 |
| 4,635,469 A * | 1/1987 | Modera | .............. | G01M 3/3236 73/40 |
| 4,993,256 A * | 2/1991 | Fukuda | ................ | G01M 3/3236 340/605 |
| 5,042,291 A * | 8/1991 | Lehmann | .............. | G01M 3/329 73/49.3 |
| 5,128,881 A * | 7/1992 | Saum | ...................... | A62C 37/50 700/282 |
| 5,559,282 A * | 9/1996 | Knight | ................... | G01M 3/12 73/38 |
| 5,722,483 A * | 3/1998 | Gibson | ................... | F24F 3/044 165/54 |
| 5,780,722 A * | 7/1998 | Kovacs | ................. | G01M 3/146 73/40 |
| 6,397,662 B1 * | 6/2002 | Alkhoury | .............. | E06B 3/5409 73/31.04 |
| 6,427,523 B1 * | 8/2002 | Seabrook | ................ | G01M 3/146 73/40.7 |
| 6,532,800 B1 * | 3/2003 | Boeckstiegel | ...... | G01M 3/3236 73/40.5 R |
| 6,877,356 B2 * | 4/2005 | Lehmann | ............ | G01M 3/3281 73/1.62 |
| 7,174,772 B2 * | 2/2007 | Sacca | ................. | G01M 3/3218 73/49.2 |
| 8,024,982 B2 * | 9/2011 | Pettit | ...................... | G01D 21/00 73/170.14 |
| 8,561,459 B2 * | 10/2013 | Caldwell | ................. | G01F 22/02 73/149 |
| 8,954,296 B2 * | 2/2015 | Sherman | ................... | G01F 1/69 703/1 |
| 9,038,441 B2 * | 5/2015 | Downing | .............. | G01M 3/226 73/40.7 |
| 9,151,691 B2 * | 10/2015 | Ono | ..................... | G01M 3/3272 |
| 9,188,508 B1 * | 11/2015 | Meyer | ................. | G01M 99/005 |
| 9,310,271 B2 * | 4/2016 | Kim | ......................... | G01F 1/34 |
| 10,156,554 B1 * | 12/2018 | Hoff | ..................... | G01N 33/004 |
| 2009/0113995 A1 * | 5/2009 | Golding | ................ | G01M 3/226 73/40.7 |
| 2009/0173136 A1 * | 7/2009 | Brockmann | ............ | G01M 3/22 73/1.58 |
| 2010/0000298 A1 * | 1/2010 | Swaffield | ................ | E03B 7/003 73/40.5 A |
| 2010/0287867 A1 * | 11/2010 | Constantino | ........... | H02G 3/088 52/309.4 |
| 2012/0053906 A1 * | 3/2012 | Sherman | ................ | G09B 23/12 703/1 |
| 2015/0107352 A1 * | 4/2015 | Sherman | ................ | G09B 23/12 73/204.25 |
| 2015/0323411 A1 * | 11/2015 | Eberlein | ............. | G01M 3/3263 73/40 |
| 2015/0338314 A1 * | 11/2015 | Meyer | ................. | G01M 99/005 73/40 |
| 2016/0258833 A1 * | 9/2016 | Haehnel | ................... | G01M 3/20 |
| 2017/0114540 A1 * | 4/2017 | McKenzie | ............... | E04C 2/292 |
| 2017/0122834 A1 * | 5/2017 | Cooper | ................ | G01M 3/32 |
| 2017/0268955 A9 * | 9/2017 | Haehnel | ................... | G01M 3/20 |
| 2017/0351349 A1 * | 12/2017 | Fassett | ................ | G06F 3/03545 |
| 2018/0328812 A1 * | 11/2018 | Fukushima | .............. | G01M 3/26 |

OTHER PUBLICATIONS

Younes et al., Air Infiltration Through Building Envelopes: A Review, Journal of Building Physics, vol. 33, No. 3, 2011.*
Šadauskienéet al., Impact of Air Tightness on the Evaluation of Building Energy Performance in Lithuania, Energies Journal, 2014.*
Card, W.H. et al., "Infrasonic Measurement of Building Air Leakage: A Progress Report," ASTM Special Technical Publication, American Society for Testing and Materials, US, vol. 719, Mar. 1, 1978 (pp. 73-88) XP008177010.
"Thermal Performance of Buildings—Determination of Air Permeability of Buildings—Fan Pressurization Method," International Standard, ISO 9972:2006(E), May 1, 2006 (28 pages) XP055203280.
European Patent Office, International Search Report in International Application No. PCT/NL2016/050088 dated May 25, 2016 (3 pages).

\* cited by examiner

METHOD AND SYSTEM FOR TESTING AIRTIGHTNESS OF A BUILDING ENVELOPE

CROSS-REFERENCE TO RELATED APPLICATIONS

This patent application is a U.S. National Phase of PCT International Application No. PCT/NL2016/050088, filed Feb. 8, 2016, which claims priority to European Application No. 15154346.9, filed Feb. 9, 2015, which are both expressly incorporated by reference in their entireties, including any references contained therein.

TECHNICAL FIELD AND BACKGROUND

The present disclosure relates to a method and system for testing airtightness of a building envelope.

A building envelope is formed by physical separators between the inside and outside of a building space. The physical separators, e.g. walls, doors, and windows are typically designed to provide a certain resistance to air flow thereby helping to maintain a conditioned environment inside the building space. The building space may comprise an entire building or a part thereof, e.g. an apartment or a room.

Measuring airtightness of a building envelope can be important e.g. to minimize energy losses, assess construction quality and determine compliance with building performance standards. Typically, airtightness can be expressed as the leak flow through the building envelope for a given pressure difference between inside and outside the envelope. For example, in the Netherlands a standardized test for building airtightness ("$qv_{10}$") comprises to determine the leak flow rate through the building envelope at an induced pressure difference of 10 Pascal across the envelope. Of course the test parameters may vary, e.g. for different countries and regulations. For some tests, the flow rate value may be normalized to the surface area of the floors or to the surface area of the envelope which may comprise e.g. the ground floor, the perimeter walls and the underside of the roof or top floor ceiling.

Conventionally, airtightness is measured by a "blower door" comprising a calibrated airflow fan, a pressure measurement instrument to simultaneously measure the pressure difference induced across the building envelope, and a system for mounting the fan in a building opening such as a door or window. A typical test consists of adjusting the fan to maintain a series of indoor/outdoor pressure differences and recording the resulting average fan and indoor/outdoor pressures which can be converted to fan airflow values. However, such tests typically require large, complicated equipment and elaborate procedures.

Accordingly, it is desired to simplify and speed up the procedure for testing of building airtightness to make it economically more viable.

SUMMARY

A first aspect of the present disclosure provides a method for testing airtightness of a building envelope. The method comprises providing an air flow generator in a duct, i.e. any opening through the building envelope, wherein the air flow generator is switchable between at least two different flow rates. The method further comprises providing a differential pressure transducer configured to measure a relative building pressure between a building pressure at the inside of the building envelope, and a reference pressure of a pressure container that is coupled to the differential pressure transducer. The method further comprises repeatedly switching the air flow generator between a first flow rate and a second flow rate for modulating the building pressure as a function of time between respective equilibrium pressure values at the first flow rate and the second flow rate. The method further comprises recording the relative building pressure as a function of time and calculating a pressure modulation amplitude of the time dependent relative building pressure for providing a measure of the airtightness.

By modulating a generated airflow between different settings until respective equilibrium pressure values are reached, the resulting pressure modulation amplitude can be measured to provide an indication of the airtightness of the building. When the building pressure reaches an equilibrium pressure value at either setting of the air flow generator, this means that the generated flow by the air flow generator is in equilibrium with the leak flow rate through the rest of the building envelope. When the airtightness of the building is relatively good, this means that equilibrium will be reached at relatively high pressure difference. When the airtightness of the building is relatively poor, this means that an equilibrium will be reached at relatively low pressure difference. When measuring the pressure modulation between different settings of the flow generator, a relatively high pressure modulation amplitude, i.e. pressure difference between the equilibria, signifies a relatively good airtightness and a relatively low pressure modulation amplitude signifies a relatively poor airtightness.

By providing a differential pressure transducer with an internal reference pressure, a modulation of the building pressure can be measured at one location inside the building without the need to measure pressure at other locations, in particular a reference point outside the building, e.g. across a blower door. This simplifies the procedure, makes it less sensitive for wind pressures and allows more flexibility in the flow generator used. Advantageously, it becomes possible to make use of an integrated ventilation system already present in the building. For example, the integrated ventilation system (the system of the building itself) can be switched on and off repeatedly while the resulting building pressure is monitored. If the flow generator, e.g. the ventilation system, cannot be turned off completely, it is also possible to use a low and high setting to produce the pressure modulation.

The present procedure comprises generating a modulated air flow and measuring the pressure modulation, which can differ from the standard pressure difference, e.g. 10 Pa. In order to pass a particular standardized test for building airtightness such as "$qv_{10}$", mentioned earlier, it is possible to estimate a comparative leakage flow rate, i.e. a leakage flow rate at a comparative or nominal pressure difference, such as 10 Pascal. For example a given flow rate of the flow generator can be used for calculating an estimated flow rate at the comparative pressure difference (e.g. standard 10 Pascal) by converting the given flow rate using the measured pressure modulation amplitude and making use of flow equations for which examples are given in the description below. Of course also other comparative pressures can be used, e.g. 50 Pascal. By optionally normalizing the flow rate with respect to the floor- or surface area of the building envelope, different types of buildings can be better compared.

It will be appreciated that the pressure modulation amplitude can be derived from the data itself, e.g. from observing sudden steps or jumps in the pressure to determine the moment of switching the flow generator. To automate the procedure, the data can be fitted e.g. using a block wave or periodic step function. Of course, the fitted function can be more elaborate, e.g. additionally taking into account the pressure build-up or equilibration inside the building between switching of the generator.

Alternatively, or in addition, any slow (zero) drift and reduction of the repeated pressure modulation signal by the reference vessel with its time constant, can be taken into account with the appropriate modelling. For example, by providing a pressure container with a damped connection to its surroundings, the reference pressure may gradually equilibrate with the building pressure. This allows more accurate measurements of the relative pressure variation. By providing a sufficiently damped pressure equilibration of the reference pressure, the measurement may be relatively unaffected by this equilibration. Preferably, the time constant for the internal pressure equilibration is much longer than the period between switching of the flow generator to have negligible effect on the measurement.

A second aspect of the present disclosure provides a computer readable medium or web service with program instructions for testing airtightness of a building envelope e.g. as described herein. When the program instructions, are executed on a computer, this may e.g. cause the computer to receive measurement values indicative of a modulated relative building pressure as a function of time; calculate a pressure modulation amplitude of the time dependent relative building pressure; and output a measure of the airtightness based on the pressure modulation amplitude. Advantageously, the program instructions may be used to autonomously determine the switching of the air flow generator between the first flow rate and the second flow rate from the received measurement values. In this way it is not necessary to separately record the switching of the generator. The switching of the generator can e.g. be done manually with an interval of about ten seconds, or more at slow fans, while the pressure is recorded anywhere in the building. For example, the repeatedly switching of the air flow generator can be determined by fitting the received measurement values to a step function. Alternatively, or in addition, the generator and/or the switching thereof of may be controlled by a program or (semi)automated system.

A third aspect of the present disclosure provides a system for testing airtightness of a building envelope. The system comprises a differential pressure transducer configured to measure a relative building pressure as a function of time between a building pressure at the inside of the building envelope, and a reference pressure of a pressure container that is coupled to the differential pressure transducer. The system further e.g. comprises a memory configured to store the recorded relative building pressures and a processor configured (programmed) to read the stored relative building pressure from the memory and/or a connection to a webserver with this functionality. The processor is further programmed to calculate a pressure modulation amplitude of the time dependent relative building pressure and output a measure of the airtightness based on the pressure modulation amplitude. The system may comprise an air flow generator and switch for repeatedly switching the air flow generator and modulating the building pressure as a function of time between respective equilibrium pressure values at the first flow rate and the second flow rate. When an integrated ventilation system of the building is used, it may be unnecessary to provide any further air flow generator.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
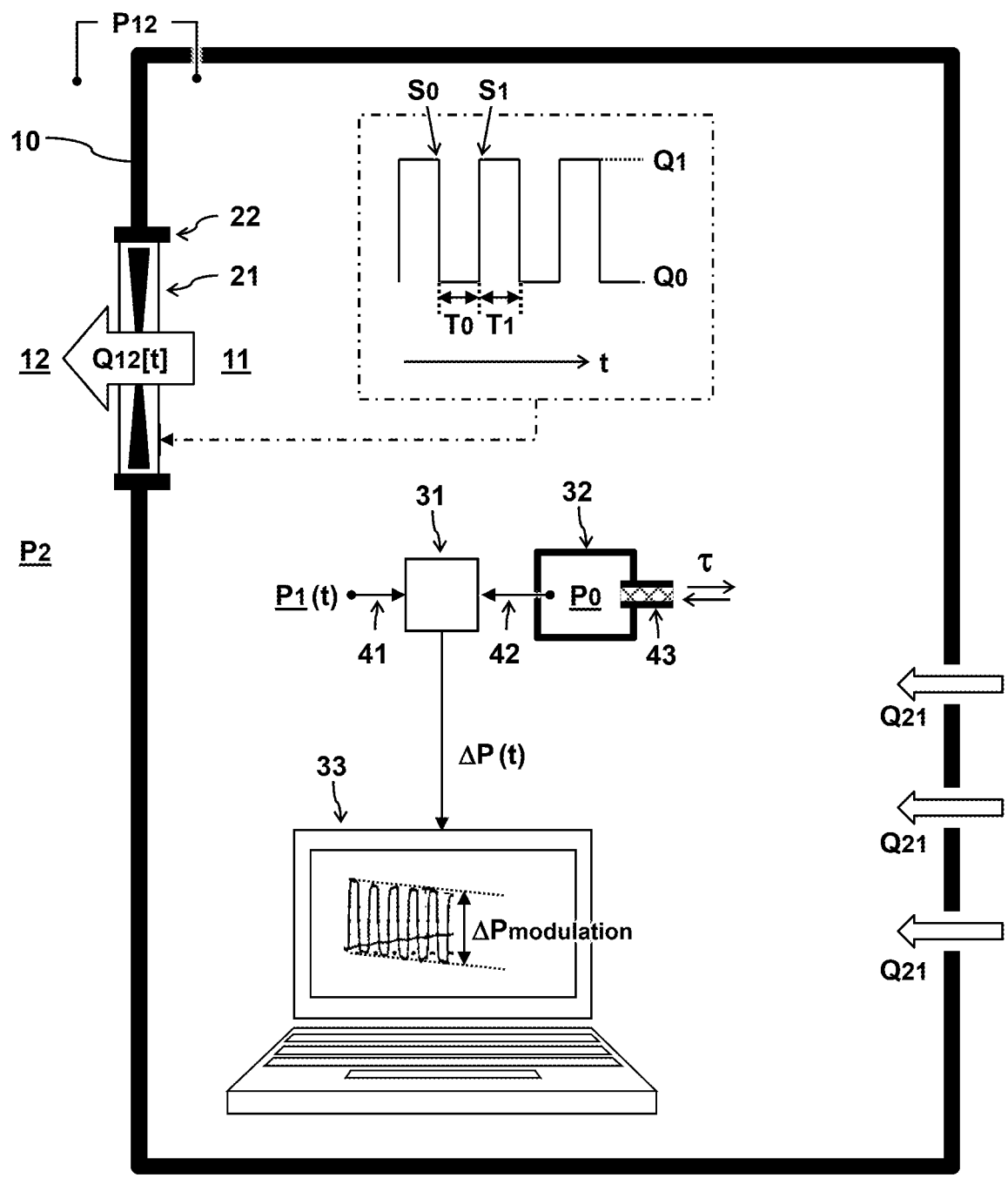
FIG. 1 schematically illustrates an embodiment of a method or system for testing airtightness of a building envelope.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

The present disclosure may provide a simplified indicative method to assess the blower door value of new and renovated dwellings. Furthermore, it can make air leak tests and performance based contracting in reach of many finished dwellings. Current test methods can be expensive and time consuming e.g. several hours for two persons. On the contrary, the present test can takes less than 15 minutes and can be a one person job in a series for minimal cost per dwelling. New or renovated dwellings have in most cases a house ventilation system with at least one fan: extract ventilation, supply ventilation or balanced ventilation. If the house has a natural ventilation system, but a kitchen hood with fan is present, that may also be used.

In one embodiment, a test apparatus consist of a pressure meter with internal reference (0.100 Pa differential pressure transducer on a damped 1 dm$^3$ vessel, e.g. insulated to minimize temperature change). With a 'building air leaktest' analysis program for laptop/mobile or a web version. Blower door values are expressed in the Netherlands as $qv_{10}$, the leak flow rate through the building envelope at 10 Pascal air pressure difference. However, the 'building air leaktest' program can be set for any convenient unit and any national limit value. Extra equipment in case of a pressure signal close to the $qv_{10}$ limit (sufficient airtightness, or too many leaks) may include a flow meter for the house fan (extract or supply) or a simplified method to check the flow rates. The $qv_{10}$ value calculated from the measurements pressure signal may e.g. be proportional to the house ventilation system flow rate, which is estimated to be 0.05 to 0.07 m³/s on average.

In one embodiment a test protocol may e.g. include one or more of the following steps. Position the pressure meter to let it stabilize at indoor temperature (near the point where the extract fan can be operated). For example, when internal doors are kept open, the pressure modulation is typically the same throughout the whole building or at least the measured part of the building. In practice there are little practical differences noticeable between lower and higher floors. Connect it to the PC/laptop/mobile with the 'building air leaktest' program, fill out test location data. Close all doors windows, façade ventilation openings and open all internal doors. Tape chimneys and existing ducts for natural ventilation. In case of balanced ventilation: switch off the supply fan if that is possible, open the supply filter cassette and seal the filter with a plastic bag/tape, reinsert the cassette (this is to minimize the leak area via the supply duct into the house). If easier: the extract fan and duct can be taped instead, and the supply fan can be used for the test. In general there will be only minor differences between air leak measurements with exhaust or supply fans. However buildings with poor build quality may have deflecting parts at high pressures (>50 Pa), which can result in such differences. Switch the fan in a convenient ten or more second on/off cycle to create a periodic, block shape pressure signal. This may be adjusted depending on how fast the fans pick up speed. The time constant of a dwelling is typically in the order of a fraction of a second, and typically doesn't play an important role. Repeat the cycle until the program indicates a stable blower door result, store the report. Restore the ventilation system in its original state: e.g. remove the bag/tape from the filter cassette and replace it. Set the fan switch in the normal mode to operate both fans, extract and supply. Remove other applied tapings from the house. Of course also further steps may be added or omitted without departing from the present scope.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically illustrates an embodiment of a method or system for testing airtightness of a building envelope 10.

In one embodiment, a differential pressure transducer 31 is provided inside the building envelope. Typically a differential pressure transducer 31 comprises two ports 41, 42 to measure a pressure difference there between. The resulting measurement can be converted e.g. to an electrical signal to be stored in a memory. The memory can be integrated in the transducer or the data can be stored elsewhere. In one embodiment, the pressure transducer is configured to measure a relative building pressure $\Delta P$. The relative building pressure $\Delta P$ may be defined as the pressure difference between the building pressure P1 at the inside 11 of the building envelope 10 and a reference pressure P0 of a pressure container 32 that is coupled to the differential pressure transducer 31. In one embodiment, the pressure container 32 is a damped vessel, e.g. comprising a damped connection 43 to its surroundings for gradually equilibrating the reference pressure P0 with the building pressure P1. In one embodiment, the pressure container 32 is configured to equilibrate the reference pressure P0 with a time constant $\tau$ longer than 100 seconds. The time constant $\tau$ may e.g. refer to the time it takes for the pressure difference |P1-P0| to reduce by a factor 1/e.

In one embodiment, an air flow generator 21 is provided e.g. in a duct 22 through the building envelope 10. A duct can be any opening through the building envelope 10 that allows the air flow generator 21 to displace air between the inside 11 and outside 12 of the building envelope 10. In one embodiment, the air flow generator 21 is switchable between at least two different flow rates Q0,Q1. In one embodiment, the air flow generator 21 is repeatedly switched between a first flow rate Q0 and a second flow rate Q1 for modulating the building pressure P1 as a function of time t. The period between switching is such that between respective equilibrium pressure values at the first flow rate Q0 and the second flow rate Q1 are reached. In one embodiment, the air flow generator 21 comprises an integrated ventilation system of the building envelope 10. Accordingly, the air flow generator 21 need not be part of a mobile system for measuring the airtightness and may be part of the existing infrastructure of the building. Alternatively, or in addition to an integrated ventilation system, a flow generator is installed, e.g. a blower door is installed in a door opening or window.

In one embodiment, the air flow generator 21 is switchable to an active mode Q1, wherein the air flow generator 21 generates an air flow Q12 between an inside 11 and an outside 12 of the building envelope 10 for creating a pressure difference P12 there between. In a further embodiment, the air flow generator 21 is switchable to an inactive mode Q0, wherein the pressure difference P12 between the inside 11 and outside 12 of the building envelope 10 is allowed to equilibrate. Accordingly, the flow generator can be relatively simple. In one embodiment the inactive mode or first flow rate Q0 is obtained by switching off the air flow generator 21. In one embodiment, the second flow rate Q1 of the air generator is measured e.g. by a flow measurement device, or otherwise known e.g. from specifications. In one embodiment, the flow generator comprises a rotating air fan configured to displace air from inside the building to outside or vice versa. Also multiple flow generators can be provided to generate the modulated air flow.

In one embodiment, the air flow generator 21 is kept for a respective time period T0,T1 at the first flow rate Q0 or the second flow rate Q1 between the switching S0,S1, at least until the respective equilibrium pressure values of the building pressure P1 are reached. For example, the air flow generator 21 is kept for a respective time period T0,T1 in the first flow rate Q0 or the second flow rate Q1 between the switching S0,S1 for at least five or ten seconds, preferably at least until the air fan has started up, reached a steady fan speed and the building pressure has equilibrated which may take a few seconds or longer.

In one embodiment the relative building pressure $\Delta P$ is recorded e.g. as a function of time "t" and a pressure modulation amplitude $\Delta P_{modulation}$ of the time dependent relative building pressure $\Delta P$ is calculated or otherwise derived. The pressure modulation amplitude may provide a direct or indirect measure of the airtightness. The relative building pressure $\Delta P$ may be recorded e.g. on a memory. The memory may comprise any kind of storage medium e.g. ROM, RAM, disk, volatile, remote network, etcetera. The calculation of the pressure modulation amplitude may be performed on processor, e.g. as part of specialized or general purpose computer or processor. Any type of hardware capable of calculating the pressure modulation amplitude from the measurements of the relative building pressure can be used and referred to as a computer. In the embodiment shown, a computer 33 is illustrated. Preferably, the computer is a mobile device, e.g. laptop, tablet, smartphone, or special-purpose device. The computer 33 may integrate the function of storing and processing the measurement data. Alternatively, the storage of measurement data can also be provided on a first device while the processing is provided on a second device. For example, the measurement of pressure data can be provided by a data logger and the calculation of the pressure modulation amplitude can be performed at another location on a computer.

The methods as described herein can be partially or wholly embodied as and/or stored on a computer readable medium. In one embodiment a computer readable medium comprises program instructions for testing airtightness of a building envelope. For example, when the program instructions are executed on a computer, this may cause the computer to perform one or more of the steps of receiving measurement values indicative of a modulated relative building pressure $\Delta P$ as a function of time "t"; calculating a pressure modulation amplitude $\Delta P_{modulation}$ of the time dependent relative building pressure $\Delta P$; and outputting a measure of the airtightness based on the pressure modulation amplitude $\Delta P_{modulation}$.

In one embodiment the program instructions may cause the computer to determine the switching S0,S1 of the air flow generator 21 between the first flow rate Q0 and the second flow rate Q1 from the received measurement values. In one embodiment the program instructions may cause the computer to determine the repeatedly switching S0,S1 of the air flow generator 21 is by fitting the received measurement values to a function, e.g. step function and/or block wave.

In one embodiment, a system for measuring airtightness comprises a memory configured to store the recorded relative building pressures $\Delta P$ and/or a processor 33 configured to read the stored relative building pressure $\Delta P$ from the memory. In one embodiment, the processor is programmed to determine switching S0,S1 of an air flow generator 21 between a first flow rate Q0 and a second flow rate Q1 from the stored relative building pressures $\Delta P$. In one embodiment, the processor calculates a pressure modulation amplitude $\Delta P_{modulation}$ of the time dependent relative building pressure $\Delta P$ and output a measure of the airtightness based on the pressure modulation amplitude $\Delta P_{modulation}$. For example, the measure of the airtightness may be output as a value, or as an indication that the building has passed or has not passed the test.

Figure 2A:
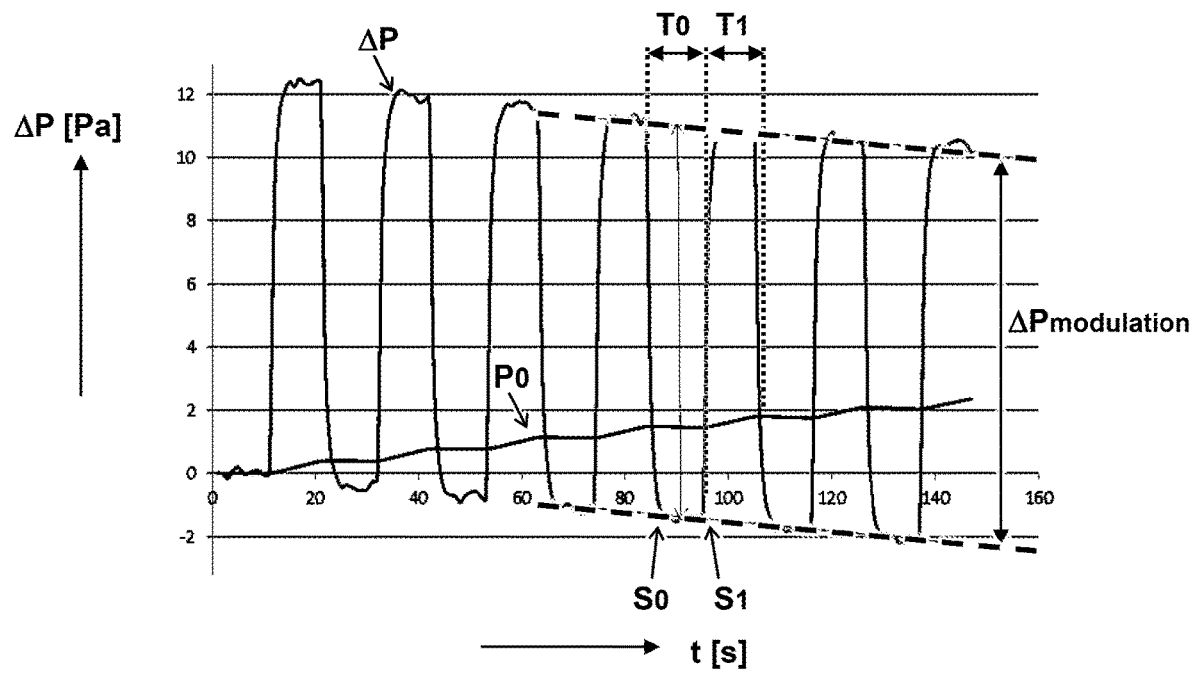
FIG. 2A illustrates a simulated pressure signal.

FIG. 2A illustrates a simulated pressure signal $\Delta P$. In the simulation, an airflow is turned on and off at an interval T0,T1 of about ten seconds. The slowly rising line P0 indicates the reference pressure in the reference volume (e.g. numeral 32 in FIG. 1). This reduces the measured pressure a bit so a correction factor can be applied, depending on the ratio of the pulse width/interval (T0=T1=10 seconds here) and the reference volume time constant "$\tau$" which is 300 seconds here. In one embodiment, a correction factor can be set close to $1+T0/tau$ if $T0 \ll tau$, but a nonlinear correction equation can also be used. The pressure modulation amplitude $\Delta P_{modulation}$ is calculated e.g. by taking the difference between the average peak and bottom pressure values, indicated by the dash-dotted lines. For example, a reading 12.28 Pa times the correction factor leads to 12.28*1.029=12.64 Pa, which is close to the actual 10.63 Pa in this example.

In one embodiment, a respective time period T0,T1 in the first flow rate Q0 or the second flow rate Q1 between switching S0,S1 is shorter than an equilibration time constant $\tau$ at which the reference pressure P0 equilibrates with the building pressure P1. In one embodiment, the pressure modulation amplitude $\Delta P_{modulation}$ is calculated taking into account the equilibration time constant $\tau$ for compensating pressure equilibration of the pressure container 32 during a respective time period T0,T1 in the first flow rate Q0 or the second flow rate Q1.

Figure 2B:
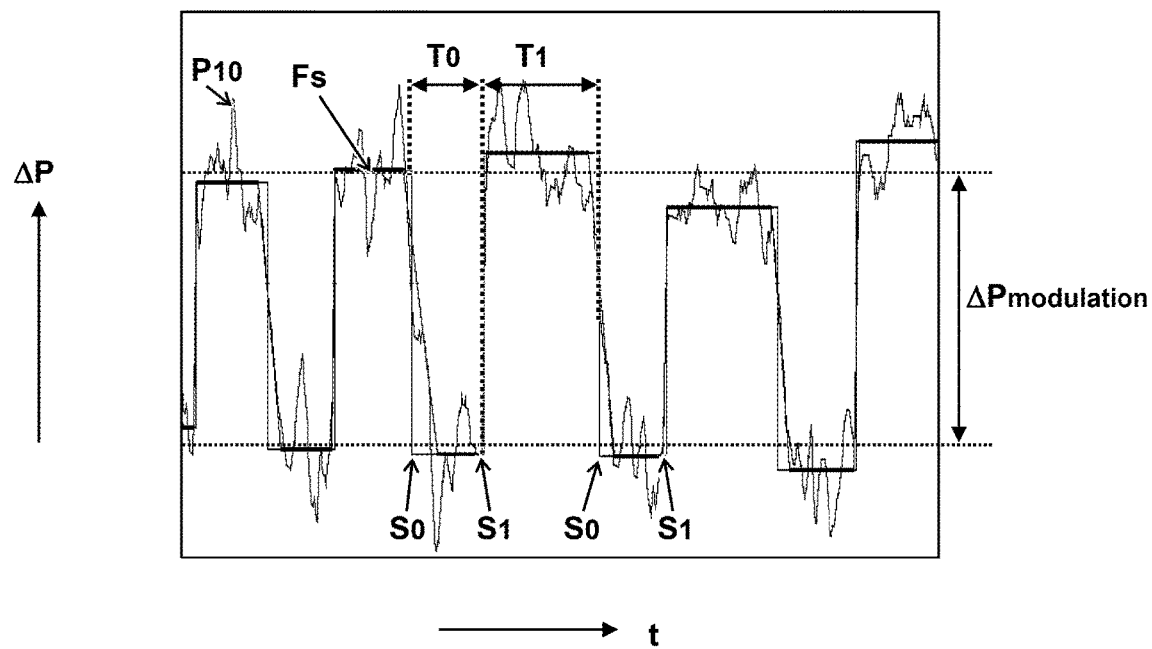
FIG. 2B illustrates a measured pressure signal processed by an analyser program.

FIG. 2B illustrates a measured pressure signal at strong wind conditions which is processed by an analyser program as described herein. Horizontal is the time "t" (about 1000 seconds is shown). The irregular (jagged) line is the measured pressure signal $\Delta P$ while the function Fs is the corresponding fit. As may be observed, the measurement can be influenced by noise e.g. caused by varying wind pressure outside the building envelope. In one embodiment, the recorded relative building pressure $\Delta P$ is fitted with a periodic step function Fs, wherein the pressure modulation amplitude $\Delta P_{modulation}$ is calculated based on a difference between minimum and maximum values of the periodic step function Fs.

In the presently shown experiment and analysis, the program calculates a $qv_{10}$ value at 0.062 m³/s @ 10 Pa. For comparison, a conventional blower door test result has yielded a value of about 0.072 m³/s. This may illustrate that the present method can yield a reasonable estimate of the airtightness without the need for installing separate blower door.

Besides the "$qv_{10}$" value also other metrics and comparative values can be derived for evaluating the air tightness. In one embodiment, a comparative leakage flow rate "Qx" of the building envelope 10 is calculated based on the pressure modulation amplitude $\Delta P_{modulation}$ and a value of the second flow rate Q1, wherein the comparative leakage flow rate Qx is different from the second flow rate Q1. In one embodiment, a comparative leakage flow rate "Qx" of the building envelope 10 is based on a calculation of $Qx=Q1 \times (Px/\Delta P_{modulation})^n$, wherein "Q1" is the first flow rate of the air flow generator 21,
"$\Delta P_{modulation}$" is the pressure modulation amplitude,
"n" is a pressure exponent of the building envelope 10, and
"Px" is a comparative pressure difference between inside and outside the building envelope for which the comparative leakage flow rate "Qx" is to be calculated, wherein "Px" is unequal to "$\Delta P_{modulation}$".

In general, "n" may represent the characteristic shape of cracks and unintentional openings through the building envelope, with values ranging from 0.5 to 1. In practice, it is found that the flow number n can be selected in a range between 0.58 and 0.72. In one embodiment, the comparative leakage flow rate, e.g. as calculated above or otherwise, is normalized by a known or estimated surface area of the building envelope.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages. It is appreciated that this disclosure offers particular advantages to testing airtightness of a building envelope, and in general can be applied for any application wherein airtightness or ventilation tests are desired.

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, embodiments of methods are considered to inherently disclose their implementation in respective hardware, where possible, in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A computer-implement method for testing airtightness of a building envelope, the method comprising:
   providing an air flow generator in a duct through the building envelope, wherein the air flow generator is switchable between a first flow rate and a second flow rate that differs from the first flow rate;
   providing a differential pressure transducer configured to measure a relative building pressure between a building pressure at the inside of the building envelope, and a reference pressure of a pressure container that is coupled to the differential pressure transducer;
   switching the air flow generator a plurality of times, during the testing, between the first flow rate and the second flow rate, thereby modulating the building pressure as a function of time between respective equilibrium pressure values at the first flow rate and the second flow rate, wherein the air flow generator is kept at the first flow rate or the second flow rate, after switching between the first flow rate and the second flow rate, at least until the respective equilibrium pressure values are reached;
   recording the relative building pressure as a function of time during the switching; and
   determining, based on the recorded relative building as a function of time, an amplitude of the pressure modulation between the respective equilibrium pressure values as a measure of the airtightness of the building envelope.

2. The method according to claim 1, wherein the air flow generator comprises an integrated ventilation system of the building envelope.

3. The method according to claim 1, wherein the first flow rate is obtained by switching off the air flow generator.

4. The method according to claim 3, wherein a comparative leakage flow rate of the building envelope is calculated based on the pressure modulation amplitude and a value of the second flow rate, wherein the comparative leakage flow rate is different from the second flow rate.

5. The method according to claim 4, wherein a comparative leakage flow rate (Qx) of the building envelope is based on a calculation performed according to the equation:

$$Qx = Q1 \times (Px/\Delta P_{modulation})^n,$$

where
   Q1 is the second flow rate of the air flow generator,
   $\Delta P_{modulation}$ is the pressure modulation amplitude,
   n is a pressure exponent of the building envelope, and
   Px is a comparative pressure difference between an inside and an outside the building envelope for which the comparative leakage flow rate Qx is to be calculated, wherein Px is unequal to $\Delta P_{modulation}$.

6. The method according to claim 5, wherein the value of n is selected in a range between 0.58 and 0.72.

7. The method according to claim 4, wherein the comparative leakage flow rate is normalized by a floor area or surface area of the building envelope.

8. The method according to claim 1, wherein the recorded relative building pressure is fitted with a periodic step function, and
   wherein the pressure modulation amplitude is calculated based on a difference between minimum and maximum values of the periodic step function.

9. The method according to claim 1, wherein the pressure container comprises a damped connection to surroundings of the pressure container for gradually equilibrating the reference pressure with the building pressure.

10. The method according to claim 9, wherein a respective time period in the first flow rate or the second flow rate between switching is shorter than an equilibration time constant with which the reference pressure equilibrates with the building pressure.

11. The method according to claim 10, wherein the pressure modulation amplitude is calculated taking into account the equilibration time constant for compensating pressure equilibration of the pressure container during a respective time period in the first flow rate or the second flow rate.

12. The method according to claim 1, wherein the flow generator comprises a rotating air fan configured to displace air from inside the building to outside or vice versa.

13. The method according to claim 1, wherein the air flow generator is kept for a respective time period in the first flow rate of the second flow rate between the switching for at least five seconds, at least until the air fan has started up, reached a steady fan speed and the building pressure has equilibrated.

14. A system for testing airtightness of a building envelope, the system comprising:
    a differential pressure transducer configured to measure a relative building pressure as a function of time between:
        a building pressure at the inside of the building envelope, and
        a reference pressure of a pressure container that is coupled to the differential pressure transducer;
    an air flow generator providing an air flow in a duct through the building envelope, wherein the air generator is switchable between a first flow rate and a second flow rate that differs from the first flow rate;
    a switch for switching the air flow generator a plurality of times, during the testing, between the first flow rate and the second flow rate, thereby modulating the building pressure as a function of time between respective equilibrium pressure values at the first flow rate and the second flow rate, wherein the air flow generator is kept at the first flow rate or the second flow rate, after switching between the first flow rate and the second flow rate, at least until the respective equilibrium pressure values are reached;
    a non-transitory computer-readable memory configured to store;
        a time-series sequence of measured values for the relative building pressure as a function of time provided by the differential pressure transducer during the switching, and
        a computer-executable instructions; and
    a processor configured to execute the computer-executable instructions to perform a method comprising:
        reading the time-series sequence of measured values for the relative building pressure from the non-transitory memory;
        determining, based on the time-series sequence of measured values for the relative building pressure as a function of time, an amplitude of the modulation of the building pressure between respective equilibrium pressure values; and
        outputting a measure of the airtightness based on the amplitude of the modulation.

* * * * *